(12) United States Patent
Ansari et al.

(10) Patent No.: US 11,685,694 B2
(45) Date of Patent: Jun. 27, 2023

(54) FACILE SYNTHESIS OF SOLID SODIUM ION-CONDUCTIVE ELECTROLYTES

(71) Applicants: International Business Machines Corporation, Armonk, NY (US); Repsol, S.A., Madrid (ES)

(72) Inventors: Younes Ansari, Irvine, CA (US); Young-hye Na, San Jose, CA (US); Khanh Nguyen, Morgan Hill, CA (US); Francisco José Alía Moreno-Ortiz, Madrid (ES)

(73) Assignees: International Business Machines Corporation, Armonk, NY (US); Repsol, S.A., Madrid (ES)

( * ) Notice: Subject to any disclaimer, the term of this patent is extended or adjusted under 35 U.S.C. 154(b) by 765 days.

(21) Appl. No.: 16/686,137

(22) Filed: Nov. 16, 2019

(65) Prior Publication Data

US 2021/0107835 A1    Apr. 15, 2021

(30) Foreign Application Priority Data

Oct. 10, 2019   (EP) ................................ 19382888

(51) Int. Cl.
    *C04B 35/447*      (2006.01)
    *C04B 35/626*      (2006.01)
    *H01M 6/18*      (2006.01)

(52) U.S. Cl.
    CPC ...... *C04B 35/447* (2013.01); *C04B 35/62615* (2013.01); *C04B 35/62695* (2013.01);
(Continued)

(58) Field of Classification Search
    CPC ............ C04B 35/447; C04B 35/62615; C04B 35/62695; C04B 2235/3244;
(Continued)

(56) References Cited

U.S. PATENT DOCUMENTS

2007/0125644 A1*   6/2007   Heller ..................... H01M 4/12
                                                      204/290.01
2011/0275008 A1*   11/2011   Kim ..................... H01M 8/1018
                                                      429/491

FOREIGN PATENT DOCUMENTS

CN      105355966 A      11/2015
CN      106684369 A      2/2017

OTHER PUBLICATIONS

Ruan et al., CN 105355966 A; Espacenet machine translation, 2016 (Year: 2016).*

(Continued)

*Primary Examiner* — Adam A Arciero
(74) *Attorney, Agent, or Firm* — Karen Canaan; CanaanLaw, P.C.

(57) ABSTRACT

Disclosed is a rapid, reproducible solution-based method to synthesize solid sodium ion-conductive materials. The method includes: (a) forming an aqueous mixture of (i) at least one sodium salt, and (ii) at least one metal oxide; (b) adding at least one phosphorous precursor as a neutralizing agent into the mixture; (c) concentrating the mixture to form a paste; (d) calcining or removing liquid from the paste to form a solid; and (e) sintering the solid at a high temperature to form a dense, non-porous, sodium ion-conductive material. Solid sodium ion-conductive materials have electrochemical applications, including use as solid electrolytes for batteries.

26 Claims, 8 Drawing Sheets

(52) U.S. Cl.
CPC ........... *H01M 6/186* (2013.01); *H01M 6/188* (2013.01); *C04B 2235/3244* (2013.01); *C04B 2235/3418* (2013.01); *C04B 2235/442* (2013.01); *H01M 2300/0077* (2013.01)

(58) Field of Classification Search
CPC ..... C04B 2235/3418; C04B 2235/442; H01M 2300/0077
See application file for complete search history.

(56) References Cited

OTHER PUBLICATIONS

Bohnke et al., Conductivity measurements on nasicon and nasicon-modified materials, Solid State Ionics 122:127-136 (1999).
Di Vona et al., Sol-Gel Synthesis of Nasicon: 1D and 2D NMR Investigation, Chem. Mater. 11(5):1336-1341 (1999).
Fuentes et al., Influence of microstructure on the electrical properties of Nasicon materials, Solid State Ionics 140:173-179 (2001).
Fuentes et al., Processing and electrical properties of Nasicon prepared from yttria-doped zirconia precursors, Journal of the European Ceramic Society 21:737-743 (2001).
Gordon et al., Fabrication and Characterization of Nasicon Electrolytes, Solid State Ionics 3/4:243-248 (1981).
Jolley et al., Improving the ionic conductivity of Nasicon through aliovalent cation substitution of Na3Zr2Si2PO12, Ionics, 21(11):1-8 (2015).
Miura et al., High-performance solid-electrolyte carbon dioxide sensor with a binary carbonate electrode, Sensors and Actuators B, 9:165-170 (1992).
Miura et al., Carbon Dioxide Sensor Using Sodium Ion Conductor and Binary Carbonate Auxiliary Electrode, J. Electrochem. Soc. 139(5):1384-1388 (1992).
Noi et al., Liquid-phase sintering of highly Na+ ion conducting Na3Zr2Si2PO12 ceramics using Na3BO3 additive, Journal of the American Ceramic Society, 00:1-11 (2017).
Perles et al., Synthesis, Structure, and Catalytic Properties of Rare-Earth Ternary Sulfates, Chem. Mater. 17(10):2701-2706 (2005).
Sadoka et al., Solid-state electrochemical CO2 gas sensors based on sodium ionic conductors, Journal of Materials Science 28:5783-5792 (1993).
Shimizu et al., Sol-gel synthesis of Nasicon discs from aqueous solution, J. Mater. Chem. 7(8):1487-1490 (1997).
Shimizu & Ushijima, Sol-gel processing of Nasicon thin film using aqueous complex precursor, Solid State Ionics 132:143-148 (2000).
Wang et al., Synthesis and Characterization of Nasicon Nanoparticles by Sol-gel Method, Chem. Res. Chinese Universities 25(1):13-16 (2009).
Zhang et al., Preparation and characterization of Nasicon with a new sol-gel process, Materials Letters 58:226-229 (2003).
Zhou & Ahmad, Synthesis, processing and characterization of nasicon solid electrolytes for CO2 sensing applications, Sensors and Actuators B 122:419-426 (2007).

\* cited by examiner

Synthesis of $Na_3La(PO_4)_2$ - Literature $Na_2CO_3$  $La_2O_3$ and $NH_4H_2PO_4$ Grinded Pretreated in the furnace at 400 °C for 5 hours Calcined at high temperature to melt the mixture Sintered at 1100 °C for 50 hours Conductivity ~ $10^{-12}$ S/cm

FACILE SYNTHESIS OF SOLID SODIUM ION-CONDUCTIVE ELECTROLYTES

JOINT RESEARCH AGREEMENT

The subject matter of this disclosure describes activities undertaken within the scope of a joint research agreement that was in place before the effective date of the instant application. The parties to the joint research agreement are International Business Machines Corporation (Armonk, N.Y., USA) and Repsol, S.A. (Madrid, Spain).

TECHNICAL FIELD

This disclosure relates generally to electrolyte synthesis, and more specifically to synthesis of solid sodium ion-conductive electrolytes.

BACKGROUND OF THE INVENTION

Solid ion-conductive electrolytes have been proposed as alternatives to liquid electrolytes in metal ion batteries. One family of solid ion-conductive electrolytes are the sodium super ion-conductor (NASICON) compounds, which have the chemical formula $Na_{1+x}Zr_2Si_xP_{3-x}O_{12}$, in which $0<x<3$. NASICON compounds crystalize into NASICON structures when annealed at temperatures above 1100° C. At such high temperatures, a distortion from rhombohedral to monoclinic symmetry takes place to form a super ion-conductive ceramic. The conductivities of NASICON ceramics have been reported to be on the order of $10^{-4}$ at room temperature.

Current methods for the synthesis of NASICON ceramic suffer greatly from extended processing times, which result in the loss of material and contamination. For example, for the highest conductivity NASICON pellets, which are used for electrochemical measurement purposes, it may take several days to a week to fabricate the pellets. Such long procedures are hard to replicate, are very time consuming, and are most often are associated with the formation of NASICON pellets with zirconium or phosphorus deficiency. Further, the extended ball-milling process required of conventional NASICON synthesis methods have limited the large-scale manufacturing of NASICON compounds. Thus, there remains a need in the art for a faster and more efficient method to fabricate NASICON ceramics.

SUMMARY OF THE INVENTION

The present invention overcomes the need in the art by providing a fast and straightforward solution-based method to fabricate NASICON ceramics. The solution-based method is also applicable to the fabrication of non-NASICON sodium ion-conductive materials.

In one aspect, the present invention relates to a method comprising: (a) forming an alkaline mixture by mixing together in a liquid, (i) at least one sodium salt comprising a sodium cation and a basic anion, and (ii) at least one metal oxide; (b) neutralizing the alkaline mixture with a solution comprising at least one phosphorous precursor; (c) concentrating the neutralized mixture to form a paste; (d) removing the liquid from the paste to form a solid; and (e) sintering the solid at a temperature in the range of 900° C. to 1250° C., wherein the sintered solid is an ion-conductive ceramic comprising sodium, at least one metal, oxygen, and phosphorous.

In another aspect, the present invention relates to a method comprising: (a) forming an aqueous mixture by mixing together in a liquid, (i) at least one sodium salt comprising a sodium cation and a basic anion, (ii) at least one metal oxide, and (c) at least one phosphorous precursor as a neutralizing agent; (b) concentrating the aqueous mixture to form a paste; (c) removing any liquid from the paste to form a solid; and (d) sintering the solid at a temperature in the range of 900° C. to 1250° C., wherein the sintered solid is an ion-conductive ceramic comprising sodium, at least one metal, oxygen, and phosphorous.

In a further aspect, the present invention relates to a method comprising: (a) forming an alkaline mixture by mixing together in a liquid, (i) at least one sodium salt comprising a sodium cation and a basic anion, and (ii) at least one metal oxide; (b) neutralizing the alkaline mixture with a solution of phosphoric acid ($H_3PO_4$); (c) concentrating the neutralized mixture to form a paste; (d) removing the liquid from the paste to form a solid; and (e) sintering the solid at a temperature in the range of 900° C. to 1250° C., wherein the sintered solid is an ion-conductive ceramic comprising sodium, at least one metal, oxygen, and phosphorous.

In another aspect, the present invention relates to a method comprising: (a) forming an aqueous mixture by mixing together in a liquid, (i) at least one sodium salt comprising a sodium cation and a basic anion, (ii) at least one metal oxide, and (iii) disodium phosphate ($Na_2HPO_4$) as a neutralizing agent; (b) concentrating the aqueous mixture to form a paste; (c) removing any liquid from the paste to form a solid; and (d) sintering the solid at a temperature in the range of 900° C. to 1250° C., wherein the sintered solid is an ion-conductive ceramic comprising sodium, at least one metal, oxygen, and phosphorous.

In a further aspect, the at least one phosphorous precursor is selected from the group consisting of phosphoric acid ($H_3PO_4$), disodium phosphate ($Na_2HPO_4$), monosodium phosphate ($NaH_2PO_4$), ammonium dihydrogen phosphate ($NH_4H_2PO_4$), calcium phosphate ($Ca_3(PO_4)_2$), triethyl phosphate (($C_2H_5)_3PO_4$), trimethyl phosphate (($CH_3)_3PO_4$), tributyl phosphate (($C_4H_9)_3PO_4$), aluminum phosphate ($AlPO_4$), sodium phosphate ($Na_3PO_4$), zinc phosphate ($Zn_3(PO_4)_2$), silver phosphate ($Ag_3PO_4$), lithium phosphate ($Li_3PO_4$), and combinations thereof.

In another aspect, the at least one sodium salt is selected from the group consisting of sodium carbonate ($Na_2CO_3$), sodium bicarbonate ($Na_2HCO_3$), sodium nitrate ($NaNO_3$), sodium acetate ($NaOOCCH_3$), sodium oxalate ($Na_2C_2O_4$), sodium hydroxide ($NaOH$), sodium chloride ($NaCl$), sodium bromide ($NaBr$), sodium fluoride ($NaF$), and combinations thereof.

In a further aspect, the at least one metal oxide is selected from the group consisting of aluminum oxide ($Al_2O_3$), silicon oxide ($SiO_2$), lanthanum oxide ($La_2O_3$), zirconium dioxide ($ZrO_2$), zinc oxide ($ZnO$), cadmium oxide ($CdO$), yttrium oxide ($Y_2O_3$), scandium oxide ($Sc_2O_3$), titanium oxide ($TiO_2$), cobalt oxide ($CoO$), nickel oxide ($NiO$), niobium oxide ($NbO$, $NbO_2$, or $Nb_2O_5$), iron oxide ($Fe_3O_4$), and combinations thereof.

In another aspect, the at least one metal oxide is zirconium dioxide and silicon dioxide and the at least one metal in the ion-conductive ceramic is zirconium and silicon.

In a further aspect, the ion-conductive ceramic has the formula of $Na_{1+x}Zr_2Si_xP_{3-x}O_{12}$, wherein $0<x<3$.

In another aspect, the ion-conductive ceramic has the formula of $Na_{1+x}Zr_2Si_xP_{3-x}O_{12}$, wherein $1.5<x<2.5$; the alkaline mixture at (a) has an excess of 1-3 mol % of sodium salt; and the ion-conductive ceramic has an ionic conductivity in the range of $10^{-4}$ to $10^{-2}$ S/cm.

In a further aspect, the mixture is sonicated after neutralization.

In another aspect, the liquid is removed from the concentrated mixture via calcination.

In a further aspect, the solid is ball-milled or ground into a power prior to sintering.

In another aspect, the solid is ground into a power and the powder is pressed into pellets prior to sintering.

In a further aspect, the aqueous mixture at (a) further includes at least one doping metal precursor.

In another aspect, the at least one doping metal precursor is selected from the group consisting of germanium oxide ($GeO_2$), cobalt nitrate ($Co(NO_3)_2$), lanthanum oxide ($La_2O_3$), zirconium oxide ($ZrO_2$), cerium oxide ($CeO_2$), and combinations thereof.

Additional aspects and embodiments of the invention will be provided, without limitation, in the detailed description of the invention that is set forth below.

DETAILED DESCRIPTION OF THE INVENTION

Set forth below is a description of what are currently believed to be preferred aspects and embodiments of the claimed invention. Any alternates or modifications in function, purpose, or structure are intended to be covered by the claims of this application. As used in this specification and the appended claims, the singular forms "a," "an," and "the" include plural referents unless the context clearly dictates otherwise. The terms "comprises" and/or "comprising," as used in this specification and the appended claims, specify the presence of stated features, integers, steps, operations, elements, and/or components, but do not preclude the presence or addition of one or more other features, integers, steps, operations, elements, components, and/or groups thereof.

As used herein, the term "metal" is meant to include all d-block transition metals (Groups 3-12), f-block lanthanides rare earth elements (Groups 4-18), and p-block metalloids (Groups 13-17) included in the Period Chart of the Elements. The d-block transition metals include scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), meitnerium (Mt), darmstadtium (Ds), roentgenium (Rg) and copernicium (Cn). The f-block lanthanides include lanthanum (La), cerium (Ce), praseodymium (Pr), neodymium (Nd), promethium (Pm), samarium (Sm), Europium (Eu), Gadolinium (Gd), Terbium (Tb), Dysprosium (Dy), Holmium (Ho), Erbium (Er), Thulium (Tm), Ytterbium (Yb), and lutetium (Lu). The p-block metalloids include boron (B), silicon (Si), germanium (Ge), arsenic (As), antimony (Sb), tellurium (Te), polonium (Po), and astatine (At).

As used herein, the term "metal oxide" is meant to refer to the oxidized state of any of the foregoing transition metals, lanthanides, and metalloids.

As used herein, the terms "dopant" and "doping agent" are used to refer to a trace impurity element that is inserted into a substance in very low concentrations to alter the ion conductivity of the substance. The terms "dope," "doping," and "doped" are used to refer to the process of adding a dopant to a substance. Examples of doping agents include without limitation, aluminum (Al), calcium (Ca), boron (B), chromium (Cr), gallium (Ga), germanium (Ge), silicon (Si), zinc (Zn), zirconium (Zr), Titanium (Ti), Indium (In), Niobium (Nb), antimony (Sb), arsenic (As), cadmium (Cd), holmium (Ho), magnesium (Mg), phosphorous (P), sulfur (S), selenium (Se), tellurium (Te), and rare earth elements. The rare earth elements include cerium (Ce), dysprosium (Dy), erbium (Er), gadolinium (Gd), scandium (Sc), ytterbium (Yb), and yttrium (Y),europium (Eu), holmium (Ho), lanthanum (La), lutetium (Lu), neodymium (Nd), praseodymium (Pr), promethium (Pm), samarium (Sm), terbium (Tb), and thulium (Tm). As is known to those of skill in the art, oxides or composites of any of the foregoing elements may also be used to dope substances. Within the context of the disclosed method, any of the foregoing doping agents may be used, alone or in combination.

Disclosed herein is a method for the fabrication of dense, non-porous, solid sodium ion-conductive electrolytes that takes approximately 12 hours to synthesize. The method, which is reliable, reproducible, and suitable for large-scale manufacturing, uses relatively inexpensive starting materials compared to other known sol-gel processes and applies a single step titration process using a phosphorous precursor to form a homogenous paste resulting in a short calcination and sintering time. The method may be used to fabricate both NASICON and non-NASICON ceramic pellets. By way of comparison, conventional sol-gel processes for NASICON pellet fabrication require a combination of multiple titration steps using bases and acids and a calcination and sintering time of more than 10 hours.

In one aspect, a solid sodium ion-conductive ceramic is fabricated by: (a) forming a mixture comprising, (i) at least one sodium salt comprising a sodium cation and a basic anion, (ii) at least one metal oxide, (iii) a liquid to dissolve the sodium salt, and (iv) optionally, a doping agent; (b) addition of at least one phosphorous precursor to neutralize the salt; (c) concentrating the mixture to form a soft non-sticky paste that can be easily transferred to any container for further processing; (d) and removing liquid from the paste; (e) pellet fabrication; and (f) sintering.

In another aspect, a solid sodium ion-conductive ceramic is fabricated by: (a) in-situ formation of submicron trisodium phosphate ($Na_3PO_4$) particles by forming a mixture comprising, (i) at least one sodium salt comprising a sodium cation and a basic anion, (ii) at least one metal oxide, (iii) at least one phosphorous precursor to neutralize the salt, (iv) a liquid to dissolve the sodium salt, and (v) optionally, a doping agent; (b) concentrating the mixture to form a soft non-sticky paste that can be easily transferred to any container for further processing; (c) removing liquid from the paste; (d) pellet fabrication; and (e) sintering.

In a further aspect, the liquid used in the mixture is deionized water (resistivity: >18 MΩ-cm). In another aspect, the liquid is removed from the paste by calcination. In a further aspect, the pellets are sintered at a high temperature in the range of 900° C. to 1250° C.

Examples of sodium salts that may be used in the method include without limitation, sodium carbonate ($Na_2CO_3$), sodium bicarbonate ($Na_2HCO_3$), sodium nitrate ($NaNO_3$), sodium acetate ($NaOOCCH_3$), sodium oxalate ($Na_2C_2O_4$), sodium hydroxide (NaOH), sodium chloride (NaCl), sodium bromide (NaBr), sodium fluoride (NaF), and combinations thereof.

Examples of metal oxides that may be used in the method include without limitation, aluminum oxide ($Al_2O_3$), silicon oxide ($SiO_2$), lanthanum oxide ($La_2O_3$), and transition metal oxides such as zirconium dioxide ($ZrO_2$), zinc oxide (ZnO), cadmium oxide (CdO), yttrium oxide ($Y_2O_3$), scandium oxide ($Sc_2O_3$), titanium oxide ($TiO_2$), cobalt oxide (CoO), nickel oxide (NiO), niobium oxide (NbO, $NbO_2$, or $Nb_2O_5$), iron oxide ($Fe_3O_4$), and combinations thereof.

Examples of phosphorous precursors that may be used in the method include without limitation, phosphoric acid ($H_3PO_4$) disodium phosphate ($Na_2HPO_4$), monosodium phosphate ($NaH_2PO_4$), ammonium dihydrogen phosphate ($NH_4H_2PO_4$), calcium phosphate ($Ca_3(PO_4)_2$), triethyl phosphate ($(C_2H_5)_3PO_4$), trimethyl phosphate ($(CH_3)_3PO_4$), tributyl phosphate ($(C_4H_9)_3PO_4$), aluminum phosphate ($AlPO_4$), sodium phosphate ($Na_3PO_4$), zinc phosphate ($Zn_3(PO_4)_2$), silver phosphate ($Ag_3PO_4$), lithium phosphate ($Li_3PO_4$), and combinations thereof. Within the context of the disclosed method, the addition of the phosphorous precursor to the sodium salt/metal oxide solution forms in situ trisodium phosphate ($Na_3PO_4$) nanoparticles. While not intending to be limited by theory, it is believed that the presence of other oxides in the solution prevents the formation of large $Na_3PO_4$ particles, which allows for the formation of a more homogeneous mixture.

Figure 1A:
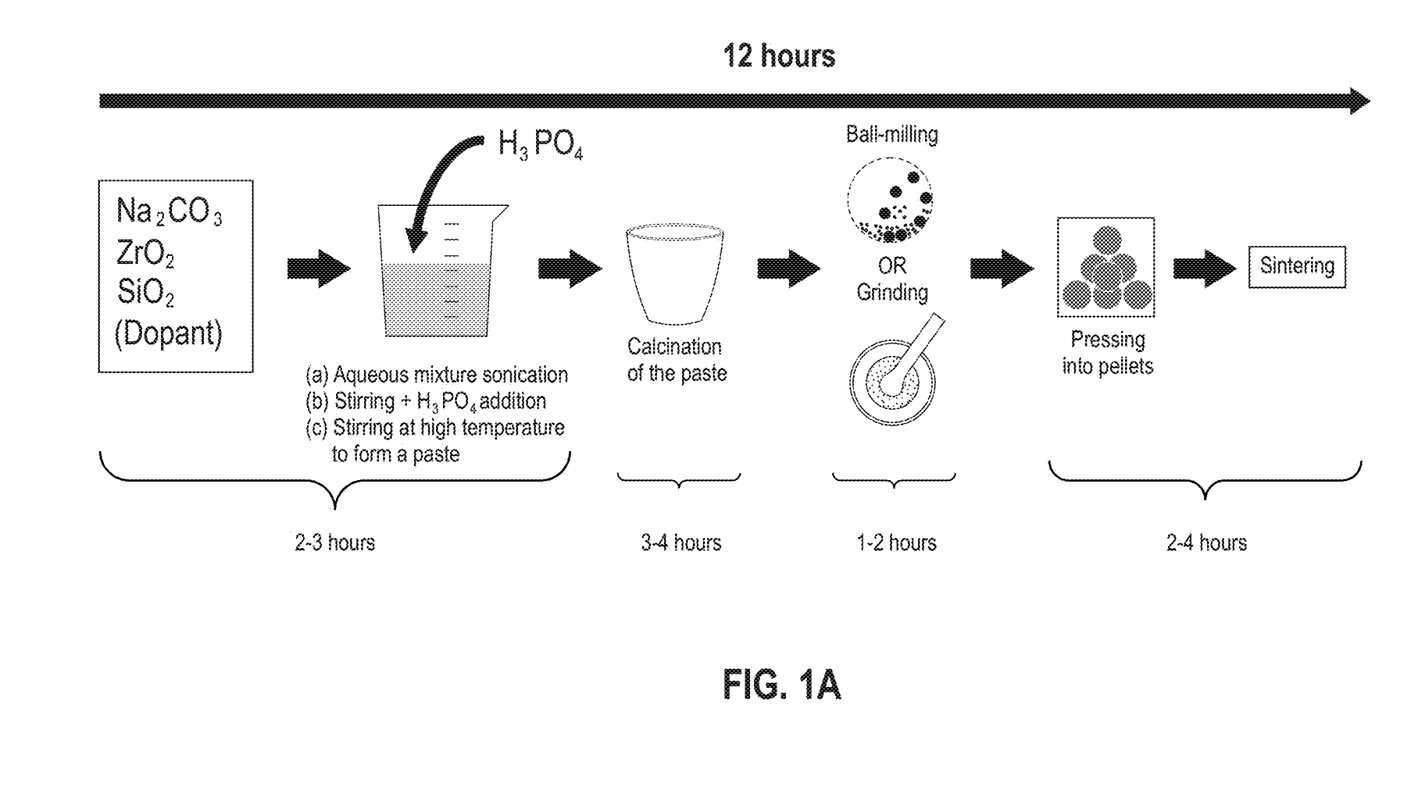
FIG. 1A is schematic illustration showing the solution-based method described herein for the fabrication of NASICON pellets using liquid phosphoric acid ($H_3PO_4$) as a phosphorous precursor.
Figure 1B:
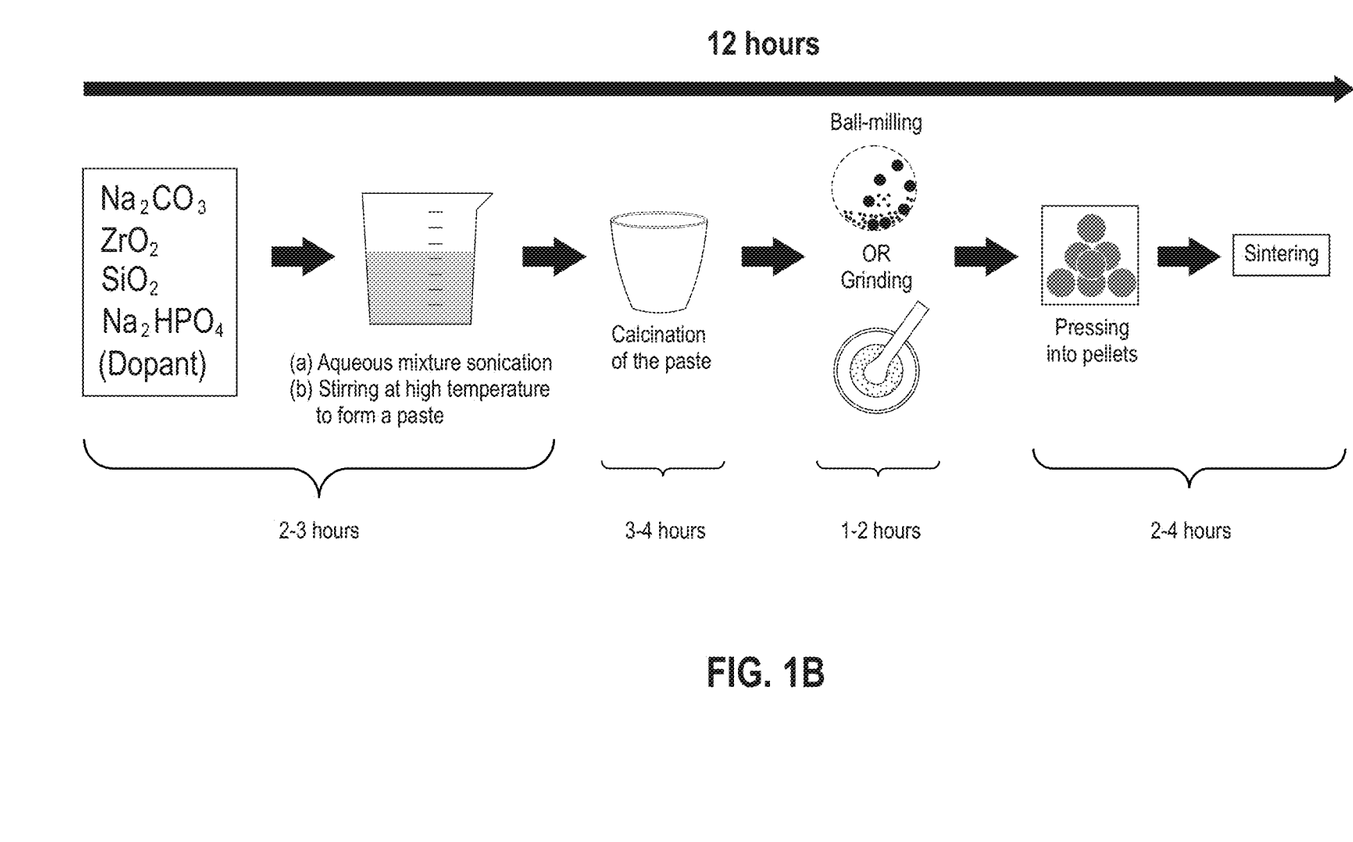
FIG. 1B is a schematic illustration showing the method described herein for the fabrication of NASICON pellets using solid disodium phosphate ($Na_2HPO_4$) as a phosphorous precursor.

In another aspect, the method disclosed herein may be used to prepare NASICON ceramics by adding silicon dioxide to the initial sodium salt/metal oxide solution (FIGS. 1A and 1B). As shown in FIG. 1A, at step one, sodium carbonate, zirconium dioxide, silicon dioxide, and optionally a dopant, are weighed and mixed via sonication in deionized water followed by stirring and the addition of phosphoric acid (a liquid). In FIG. 1B, disodium phosphate (a solid) is included as part of the initial sonicated, stirred mixture. Generally, the procedure shown in step one of FIG. 1A is applicable where the phosphorous precursor is a liquid and the procedure shown in step one of FIG. 1B is applicable where the phosphorous precursor is a solid. As will be understood by those of skill in the art, any of the phosphorous precursors disclosed herein may be applied in either solid or liquid form. In both FIGS. 1A and 1B, the sodium salt, metal oxide, and phosphorous precursor mixture is stirred at high temperature until a soft paste is formed. At step two, the resulting paste is calcined at a high temperature and at step three, the calcinated paste is ground to a powder and/or ball-milled for two hours at room temperature. At step four, the powder or ball-milled paste is pressed into pellets and at step five, the pellets are sintered at >1000° C. for 2-4 hours to crystallize them into dense NASICON pellets. The time required for the sintering is dependent upon the composition of the pellets. Examples 1 and 2 describe preparation of solid sodium ion-conductive pellets with $H_3PO_4$ and $Na_2HPO_4$, respectively, as phosphorous precursors.

Figure 2:
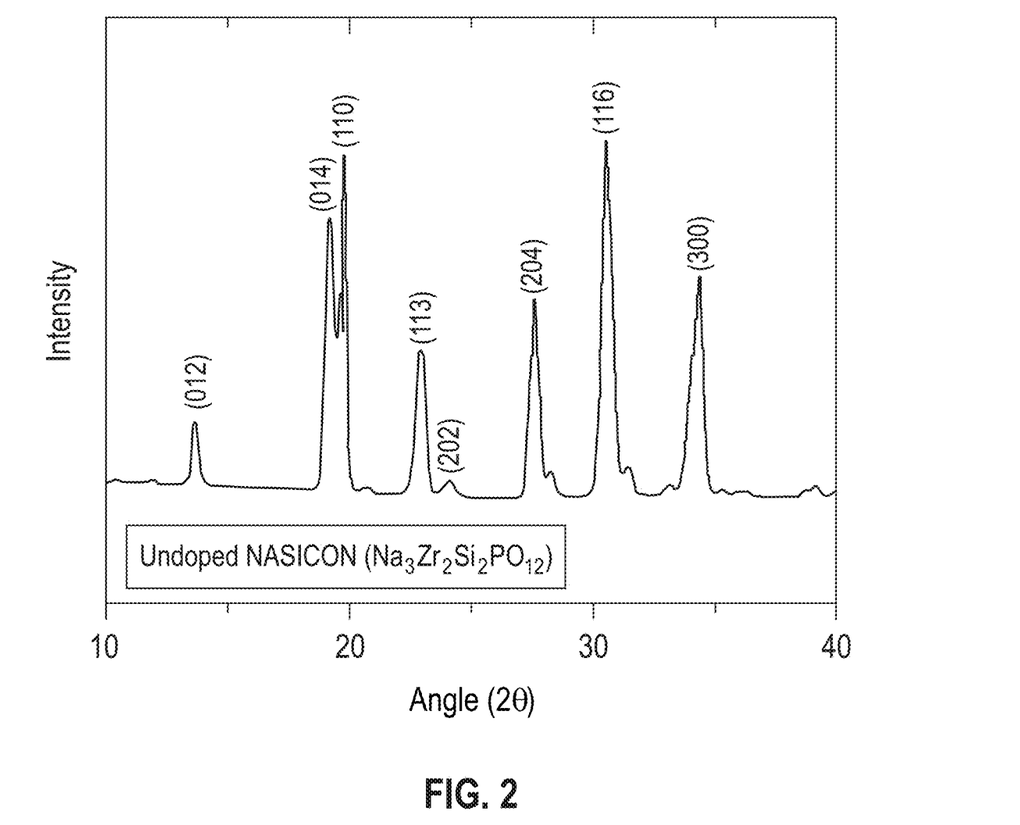
FIG. 2 is a graph showing an x-ray diffraction pattern for a NASICON powder sample synthesized according to the method described herein.

FIG. 2 shows an x-ray diffraction pattern for an (undoped) NASICON powder sample synthesized according to the method described herein. (The values of FIG. 2 were measured with a Bruker D8 Discover with GADDS 2D x-ray diffraction.) As shown in FIG. 2, the x-ray diffraction confirmed monoclinic symmetry. The size of NASICON crystallites ($\tau$) are calculated using the Scherrer equation:

$$\tau = \frac{K\lambda}{\beta \cos\theta}$$

where K is a dimensionless shape factor with a value typically between 0.9-1.0; λ is the x-ray wavelength; β is the line broadening at half the maximum intensity (full width at half maximum or FWHM); and θ is the Bragg angle, which represents the angles for coherent and incoherent scattering from a crystal lattice. Applying this equation to the data peak 116 in FIG. 2, the size of the NASICON crystallites ($\tau$) is calculated to be 26 nm where K=1; λ =1.54 Å (for Cu $K_\alpha$); β=0.352° (0.00615 rad); and θ=15.6° (0.963 rad). FIG. 2 also shows the corresponding Miller indices (hkl) for each peak. As is known to those of skill in the art, Miller indices show the peak of x-ray diffraction on a particular plane (the plane value being shown parenthetically in FIG. 2).

Figure 3:
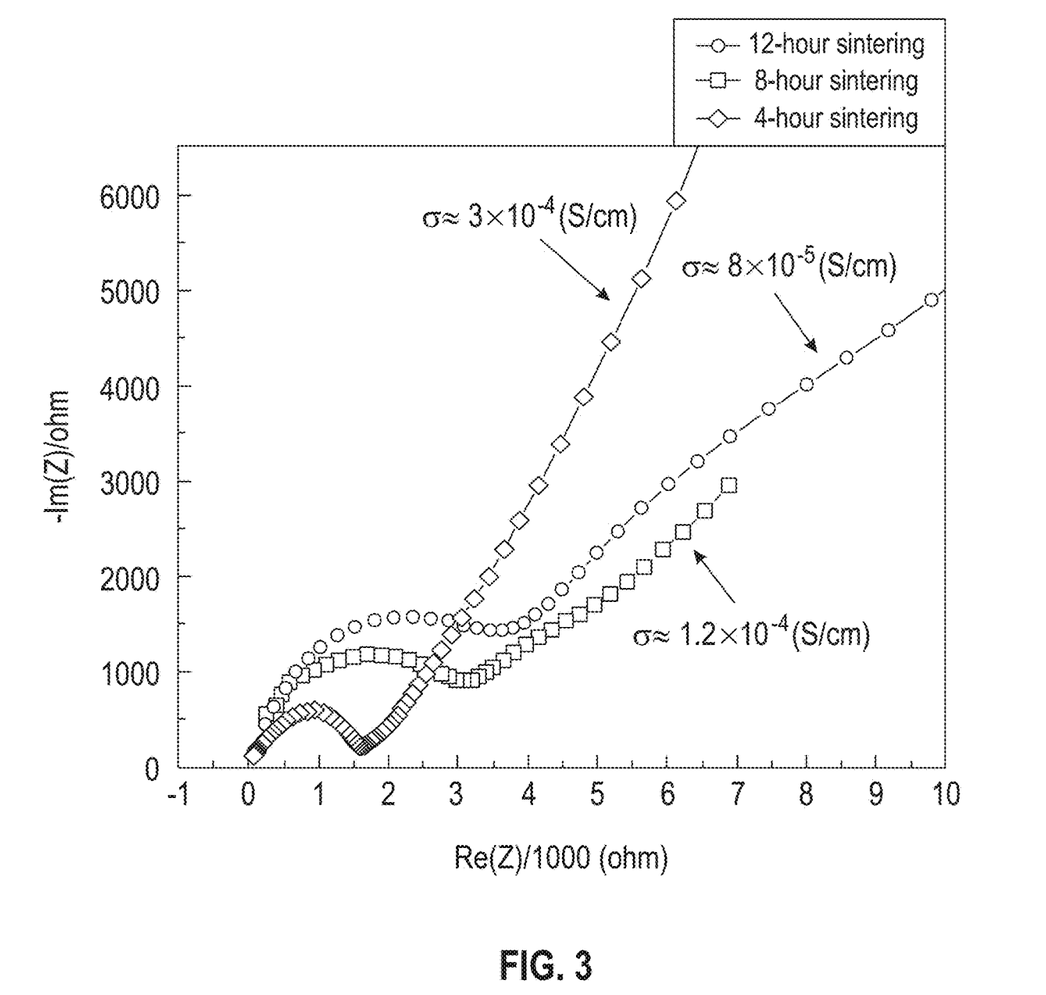
FIG. 3 is a graph showing Nyquist plots for NASICON pellet fabricated according to the method described herein.

FIG. 3 shows Nyquist plots of the same batch of NASICON pellets sintered at 1200° C. for 4 hours, 8 hours, and 12 hours at frequencies between 7 mHz and 100 mHz with corresponding DC conductivities. As is shown therein, a lower sintering time results in a pellet with better conductivity, indicative of NASICON pellets with monoclinic crystal structure.

Figure 4:
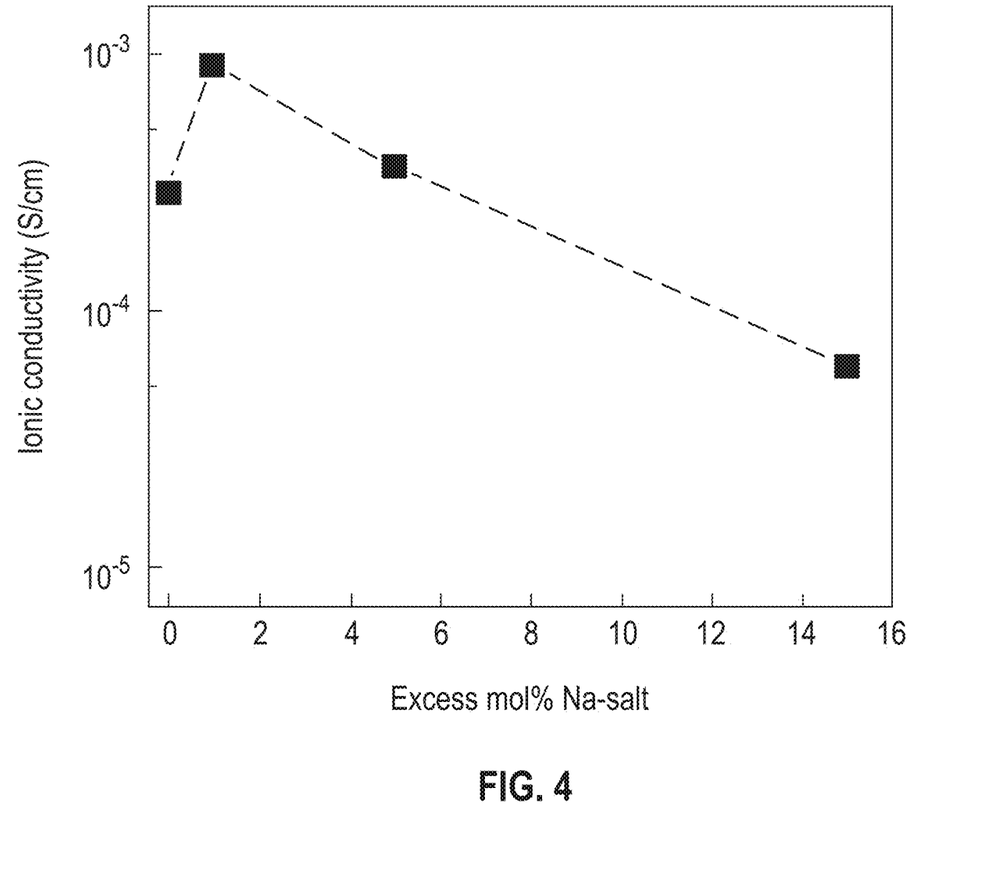
FIG. 4 is a graph showing ion conductivity of NASICON pellets fabricated according to the method described herein with various amounts of sodium salt.

In one aspect, NASICON ceramics fabricated according to the disclosed method have the formula of $Na_{1+x}Zr_2Si_xP_{3-x}O_{12}$, wherein 0<x<3. In another aspect, the NASICON ceramics have the formula $Na_{1+x}Zr_2Si_xP_{3-x}O_{12}$, wherein 1.5<x<2.5 and the ion-conductive ceramic has an ionic conductivity in the range of $10^{-4}$ to $10^{-2}$ S/cm. In a further aspect, the at least one sodium salt is introduced into the method in an excess molar concentration. In another aspect, the excess sodium salt concentration is less than 3 mol %. FIG. 4 shows the values for ion conductivity (y-axis in S/cm) of NASICON ceramic pellets fabricated with various amounts of excess salt (x-axis in mol %). As shown therein, the ion conductivity of the NASICON compounds reaches a maximum value of $10^{-3}$ S/cm when 1 mol % excess salt is used.

Figure 5A:
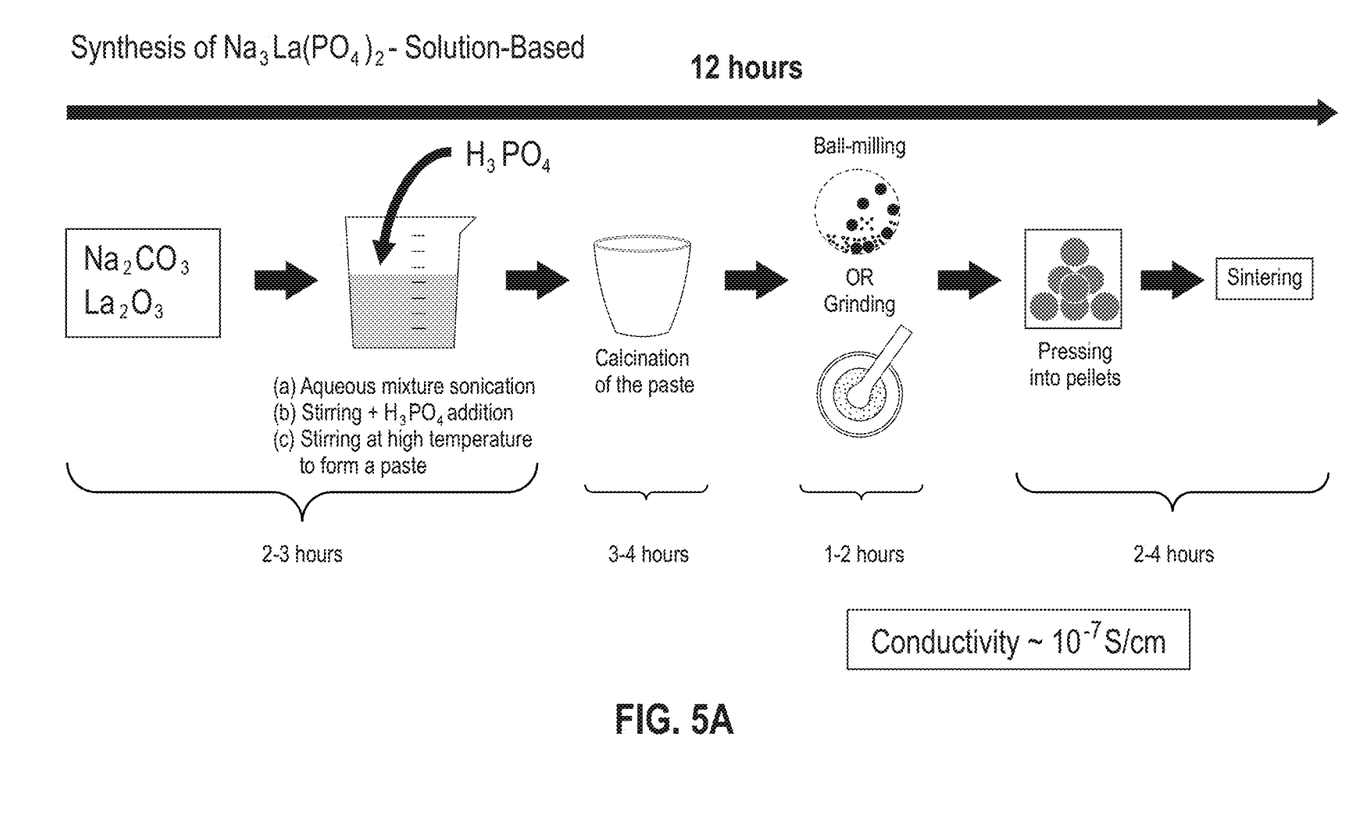
FIG. 5A is a schematic illustration of the solution-based method described herein for the synthesis of a non-NASICON $Na_3La(PO_4)_2$ ceramic.
Figure 5B:
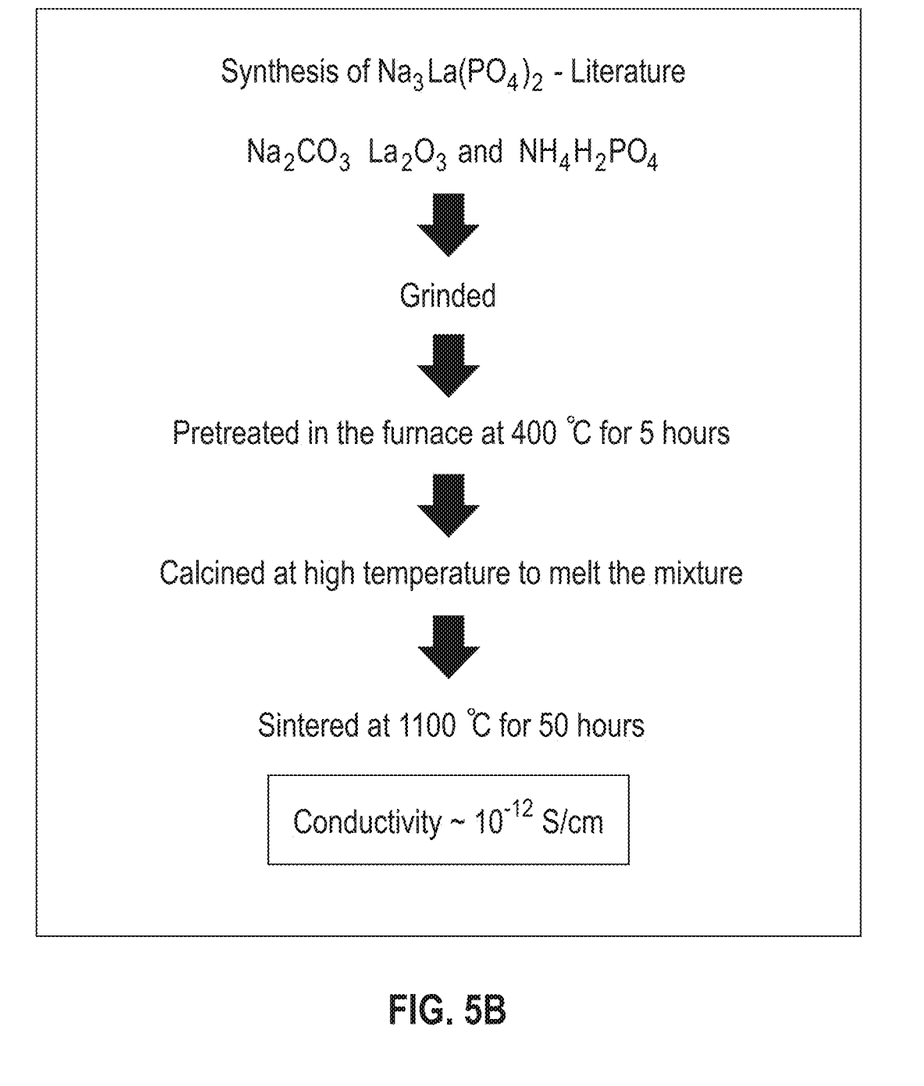
FIG. 5B is a schematic illustration of a conventional method known in the art for the synthesis of a non-NASICON $Na_3La(PO_4)_2$ ceramic.
Figure 5C:
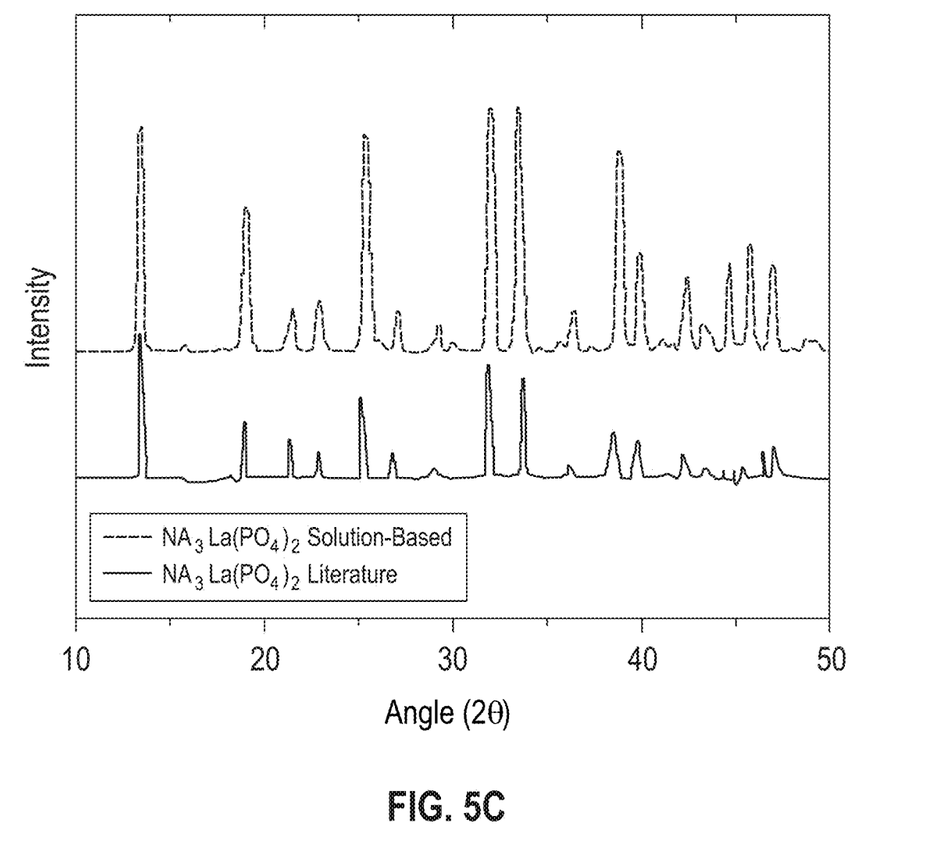
FIG. 5C is graph showing the difference in x-ray diffraction patterns for the non-NASICON $Na_3La(PO_4)_2$ ceramics of FIGS. 5A and 5B.

The solution-based method described herein may also be used to fabricate other sodium-containing ceramics. Example 5 describes the synthesis of the non-NASICON type ceramic material $Na_3La(PO_4)_2$ using the solution-based method described herein. FIGS. 5A and 5B compare the solution-based method described herein for the fabrication of $Na_3La(PO_4)_2$ to a conventional process known in the art (Perles et al., *Chem. Mater.* 17(10):2701-2706 (2005)), and FIG. 6 compares the x-ray diffraction of the two sodium-containing ceramics. As shown in FIGS. 5A and 5B, the method described herein is approximately five times faster than the conventional process and the resulting sodium ion-conducting ceramic material of the method described herein has improved conductivity over the conventional process. FIG. 6 shows that the $Na_3La(PO_4)_2$ ceramics fabricated according to the solution-based method described herein have much greater intensity than the same $Na_3La(PO_4)_2$ ceramics prepared according to the conventional technique shown in FIG. 5B.

It is to be understood that the NASICON and non-NASICON compounds described herein may be doped with any suitable compound, including without limitation, germanium oxide ($GeO_2$), cobalt nitrate ($Co(NO_3)_2$), lanthanum oxide ($La_2O_3$), zirconium oxide ($ZrO_2$), cerium oxide ($CeO_2$), and combinations thereof. With cobalt nitrate, it is to be understood that the solid will be mixed with water. Within the context of the present invention, cobalt nitrate will typically be used as $Co(NO_3)_2 \cdot H_2O$ where n=0,2,4,6). Examples 3 and 4 describe the doping of NASICON with germanium oxide and cobalt nitrate hexahydrate (($Co(NO_3)_2 \cdot 6H_2O$), respectively. FIGS. 1A and 1B also show that a dopant may be included with the starting materials for the solution-based method disclosed herein.

The fast, efficient, solution-based method described herein will facilitate the application of NASICON and non-NASICON ion-conductive sodium-based structures to be applied more readily and universally than they have been in the past. Sodium ion-conductive ceramics have application as electrochemical gas sensors with ultra-high sensitivity and as an alternative to liquid organic electrolytes, the latter of which suffer from the intrinsic safety issues associated with their flammability and toxicity of the liquid.

It is to be understood that while the invention has been described in conjunction with the aspects and embodiments set forth above, the foregoing description as well as the examples that follow are intended to illustrate and not limit the scope of the invention. Further, it is to be understood that the aspects, embodiments, and examples set forth herein are not exhaustive and that modifications and variations of the invention will be apparent to those of ordinary skill in the art without departing from the scope and spirit of the invention.

Experimental

The following examples are set forth to provide those of ordinary skill in the art with a complete disclosure of how to make and use the aspects and embodiments of the invention as set forth herein. While efforts have been made to ensure accuracy with respect to variables such as amounts, temperature, etc., experimental error and deviations should be taken into account. Unless indicated otherwise, parts are parts by weight, temperature is degrees centigrade, and pressure is at or near atmospheric. All components were obtained commercially unless otherwise indicated.

EXAMPLE 1

SYNTHESIS OF NASICON ($Na_3Zr_2Si_2PO_{12}$) WITH $H_3PO_4$ AS A PHOSPHOROUS PRECURSOR

Sodium carbonate (2.92 grams), zirconium oxide (4.48 grams), and silicon oxide (2.184 grams) were mixed in 125 mL of DI water and stirred for 10 min to form a mixture. Next, phosphoric acid ($H_3PO_4$) 85% (2.096 grams) was added to 20 mL of water and the resulting solution was added dropwise to the mixture to form a slurry. The slurry was heated at 180° C. for 1-2 hours until a paste was formed. The paste was calcined at 700° C. for 3 hours followed by milling for 1 hour to form a fine powder. The powder was pressed into pellets at 7 tons of pressure and the pellets were sintered at 1200° C. for 4 hours (the furnace ramp rate was set at 5° C./min). The sintered pellets were polished with silicon carbide and garnet sand papers to an approximate thickness of 1.0 mm, and their conductivity was measured after coating their surfaces with gold (Au) as a conductive metal. The conductivity of the sintered pellets was $9.8 \times 10^{-4}$ S/cm.

EXAMPLE 2

SYNTHESIS OF NASICON ($Na_3Zr_2Si_2PO_{12}$) WITH $Na_2HPO_4$ AS A PHOSPHOROUS PRECURSOR

Sodium carbonate (1.03 grams), zirconium oxide (4.64 grams), silicon oxide (2.27 grams), and disodium phosphate ($Na_2HPO_4$, 5.05 grams) were mixed in 150 mL of deionized (DI) water and stirred for 10 min to form a mixture (FIG. 1B). The mixture was heated at 180° C. for 1-2 hours until a paste was formed. The paste was calcined at 700° C. for 3 hours followed by milling for 1 hour to form a fine powder. The powder was pressed into pellets at 7 tons of pressure and the pellets were sintered at 1200° C. for 4 hours with the furnace ramp rate set at 5 C/min. The sintered pellets were polished with silicon carbide and garnet sand papers to an approximate thickness of 1.0 mm, and their conductivity was measured after coating their surfaces with gold as a conductive metal. The conductivity of the sintered pellets was $2.0 \times 10^{-4}$ S/cm.

EXAMPLE 3

SYNTHESIS OF GE-DOPED NASICON ($Na_3Zr_{1.8}Ge_{0.2}Si_2PO_{12}$)

Sodium carbonate (2.92 grams), zirconium oxide (4.032 grams), germanium oxide (0.384 grams), and silicon oxide (2.184 grams) were mixed in 125 mL of DI water and stirred for 10 min to form a mixture. Next, phosphoric acid 85% (2.096 grams) was added to 20 mL of water and the solution was added dropwise to the mixture to form a slurry. The slurry was heated at 180° C. for 1-2 hours until a paste was formed. The paste was calcined at 700° C. for 3 hours followed by milling for 1 hour to form a fine powder. The powder was pressed into pellets at 7 tons of pressure and the pellets were sintered at 1200° C. for 1 hour (the furnace ramp rate was set at 5° C./min). The pellets were polished with silicon carbide and garnet sand papers to an approximate thickness of 1.0 mm and their conductivity was measured after coating their surfaces with gold as a conductive metal. The conductivity of the pellet of this example was $9.3 \times 10^{-4}$ S/cm.

EXAMPLE 4

SYNTHESIS OF CO-DOPED NASICON ($Na_3Zr_{1.8}Co_{0.2}Si_2PO_{12}$)

Sodium carbonate (2.92 grams), zirconium oxide (4.032 grams), cobalt nitrate hexahydrate (1.053 grams), and silicon oxide (2.184 grams) were mixed in 125 mL of DI water and was let to stir for 10 min for form a mixture. Next, phosphoric acid 85% (2.096 grams) was added to 20 mL of water and the solution was added dropwise to the mixture to form a slurry. The slurry was heated at 180° C. for 1-2 hours until a paste was formed. The paste was calcined at 700° C. for 3 hours followed by milling for 1 hour to form a fine powder. The powder was pressed into pellets at 7 tons of pressure, and the pellets were sintered at 1200° C. for 1 hour with the furnace ramp rate set at 5° C./min. The pellets were polished with silicon carbide and garnet sand papers to an approximate thickness of 1.0 mm, and their conductivity was measured after coating their surfaces with gold as a conductive metal. The conductivity of the pellet of this example was $1.3 \times 10^{-3}$ S/cm.

EXAMPLE 5

SYNTHESIS OF NON-NASICON TYPE CERAMIC: $Na_3La(PO_4)_2$

Sodium carbonate (3.533 grams) and lanthanum oxide (3.6202 grams) were mixed in 125 mL of DI water and stirred for 10 min to form a mixture. Next, phosphoric acid 85% (5.1243 grams) was added to 20 mL water, and the solution was added dropwise to the mixture to form a slurry. The slurry was heated at 180° C. for 1-2 hours until a paste was formed. The paste was calcined at 700° C. for 3 hours followed by milling for 1 hour to form a fine powder. The powder was pressed into pellets at 7 tons of pressure and the pellets were sintered at 1200° C. for 1 hour with the furnace ramp rate set to 5° C./min. The pellets were polished with silicon carbide and garnet sand papers to an approximate thickness of 1.0 mm, and their conductivity was measured after coating their surfaces with gold as a conductive metal. The conductivity of the pellet of this example was on the order of $10^{-7}$ S/cm (FIG. 5A).

We claim:

1. A method comprising:
   (a) forming an alkaline mixture by mixing together in a liquid,
      (i) at least one sodium salt comprising a sodium cation and a basic anion, and
      (ii) at least one metal oxide;
   (b) neutralizing the alkaline mixture with a solution comprising at least one phosphorous precursor;
   (c) concentrating the neutralized mixture by heating at 180° C. for 1-2 hours to form a paste;
   (d) calcinating the paste at 700° C. for 3 hours to remove liquid from the paste and to form a solid; and
   (e) sintering the solid at a temperature in the range of 900° C. to 1250° C. for 2-4 hours, wherein the sintered solid is an ion-conductive ceramic comprising sodium, at least one metal, oxygen, and phosphorous.

2. The method of claim 1, wherein the at least one phosphorous precursor is selected from the group consisting of phosphoric acid ($H_3PO_4$), disodium phosphate ($Na_2HPO_4$), monosodium phosphate ($NaH_2PO_4$), ammonium dihydrogen phosphate ($NH_4H_2PO_4$), calcium phosphate ($Ca_3(PO_4)_2$), triethyl phosphate (($C_2H_5)_3PO_4$), trimethyl phosphate (($CH_3)_3PO_4$), tributyl phosphate (($C_4H_9)_3PO_4$), aluminum phosphate ($AlPO_4$), sodium phosphate ($Na_3PO_4$), zinc phosphate ($Zn_3(PO_4)_2$), silver phosphate ($Ag_3PO_4$), lithium phosphate ($Li_3PO_4$), and combinations thereof.

3. The method of claim 1, wherein the at least one sodium salt is selected from the group consisting of sodium carbonate ($Na_2CO_3$), sodium bicarbonate ($Na_2HCO_3$), sodium nitrate ($NaNO_3$), sodium acetate ($NaOOCCH_3$), sodium oxalate ($Na_2C_2O_4$), sodium hydroxide ($NaOH$), sodium chloride ($NaCl$), sodium bromide ($NaBr$), sodium fluoride ($NaF$), and combinations thereof.

4. The method of claim 1, wherein the at least one metal oxide is selected from the group consisting of aluminum oxide ($Al_2O_3$), silicon oxide ($SiO_2$), lanthanum oxide ($La_2O_3$), zirconium dioxide ($ZrO_2$), zinc oxide ($ZnO$), cadmium oxide ($CdO$), yttrium oxide ($Y_2O_3$), scandium oxide ($Sc_2O_3$), titanium oxide ($TiO_2$), cobalt oxide ($CoO$), nickel oxide ($NiO$), niobium oxide ($NbO$, $NbO_2$, or $Nb_2O_5$), iron oxide ($Fe_3O_4$), and combinations thereof.

5. The method of claim 1, wherein the at least one metal oxide is zirconium dioxide and silicon dioxide, and the at least one metal in the ion-conductive ceramic is zirconium and silicon.

6. The method of claim 1, wherein the ion-conductive ceramic has the formula of $Na_{1+x}Zr_2Si_xP_{3-x}O_{12}$, wherein $0<x<3$.

7. The method of claim 1, wherein the ion-conductive ceramic has the formula of $Na_{1+x}Zr_2Si_xP_{3-1}O_{12}$, wherein $1.5<x<2.5$; the alkaline mixture of (a) has an excess of 1-3 mol % of sodium salt; and the ion-conductive ceramic has an ionic conductivity in the range of $10^{-4}$ to $10^{-2}$ S/cm.

8. The method of claim 1, further comprising sonicating the neutralized alkaline mixture at (b) prior to concentrating.

9. The method of claim 1, wherein the solid at (d) is milled for 1 hour to form a powder prior to the sintering.

10. The method of claim 9, wherein the powder is pressed into pellets prior to the sintering.

11. The method of claim 1, wherein the aqueous mixture at (a) further comprises (iii) at least one doping metal precursor.

12. The method of claim 11, wherein the at least one doping metal precursor is selected from the group consisting of germanium oxide ($GeO_2$), cobalt nitrate ($Co(NO_3)_2$, lanthanum oxide ($La_2O_3$), zirconium oxide ($ZrO_2$), cerium oxide ($CeO_2$), and combinations thereof.

13. A method comprising:
   (a) forming an aqueous mixture by mixing together in a liquid,
      (i) at least one sodium salt comprising a sodium cation and a basic anion,
      (ii) at least one metal oxide, and
      (iii) at least one phosphorous precursor as a neutralizing agent;
   (b) concentrating the aqueous mixture by heating at 180° C. for 1-2 hours to form a paste;
   (c) calcinating the paste at 700° C. for 3 hours to remove any liquid from the paste and to form a solid; and
   (d) sintering the solid at a temperature in the range of 900° C. to 1250° C. for 2-4 hours, wherein the sintered solid is an ion-conductive ceramic comprising sodium, at least one metal, oxygen, and phosphorous.

14. The method of claim 13, wherein the phosphorous precursor is selected from the group consisting of phosphoric acid ($H_3PO_4$), disodium phosphate ($Na_2HPO_4$), monosodium phosphate ($NaH_2PO_4$), ammonium dihydrogen phosphate ($NH_4H_2PO_4$), calcium phosphate ($Ca_3(PO_4)_2$), triethyl phosphate (($C_2H_5)_3PO_4$), trimethyl phosphate (($CH_3)_3PO_4$), tributyl phosphate (($C_4H_9)_3PO_4$), aluminum phosphate ($AlPO_4$), sodium phosphate ($Na_3PO_4$), zinc phosphate ($Zn_3(PO_4)_2$), silver phosphate ($Ag_3PO_4$), lithium phosphate ($Li_3PO_4$), and combinations thereof.

15. The method of claim 13, wherein the at least one sodium salt is selected from the group consisting of sodium carbonate ($Na_2CO_3$), sodium bicarbonate ($Na_2HCO_3$), sodium nitrate ($NaNO_3$), sodium acetate ($NaOOCCH_3$), sodium oxalate ($Na_2C_2O_4$), sodium hydroxide (NaOH), sodium chloride (NaCl), sodium bromide (NaBr), sodium fluoride (NaF), and combinations thereof.

16. The method of claim 13, wherein the at least one metal oxide is selected from the group consisting of aluminum oxide ($Al_2O_3$), silicon oxide ($SiO_2$), lanthanum oxide ($La_2O_3$), zirconium dioxide ($ZrO_2$), zinc oxide (ZnO), cadmium oxide (CdO), yttrium oxide ($Y_2O_3$), scandium oxide ($Sc_2O_3$), titanium oxide ($TiO_2$), cobalt oxide (CoO), nickel oxide (NiO), niobium oxide (NbO, $NbO_2$, or $Nb_2O_5$), iron oxide ($Fe_3O_4$), and combinations thereof.

17. The method of claim 13, wherein the least one metal oxide is zirconium dioxide and silicon dioxide, and the at least one metal in the ion-conductive ceramic is zirconium and silicon.

18. The method of claim 13, wherein the ion-conductive ceramic has the formula of $Na_{1+x}Zr_2Si_xP_{3-x}O_{12}$, wherein $0<x<3$.

19. The method of claim 13, wherein the ion-conductive ceramic has the formula of $Na_{1+x}Zr_2Si_xP_{3-1}O_{12}$, wherein $1.5<x</2.5'$, the mixture of (a) comprises an excess of 1-3 mol % of sodium salt, and the ion-conductive ceramic has an ionic conductivity in the range of $10^{-4}$ to $10^{-2}$ S/cm.

20. The method of claim 13, further comprising sonicating the aqueous mixture at (a) prior to concentrating.

21. The method of claim 13, further comprising wherein the solid at (c) is milled for 1 hour to form a powder prior to the sintering.

22. The method of claim 21, wherein the powder is pressed into pellets prior to the sintering.

23. The method of claim 13, wherein the aqueous mixture at (a) further includes (iv) at least one doping metal precursor.

24. The method of claim 23, wherein the at least one doping metal precursor is selected from the group consisting of germanium oxide ($GeO_2$), cobalt nitrate ($Co(NO_3)_2$, lanthanum oxide ($La_2O_3$), zirconium oxide ($ZrO_2$), cerium oxide ($CeO_2$), and combinations thereof.

25. A method comprising:
(a) forming an alkaline mixture by mixing together in a liquid,
   (i) at least one sodium salt comprising a sodium cation and a basic anion, and
   (ii) at least one metal oxide;
(b) neutralizing the alkaline mixture with a solution of phosphoric acid ($H_3PO_4$);
(c) concentrating the neutralized mixture by heating at 180° C. for 1-2 hours to form a paste;
(d) calcinating the paste at 700° C. for 3 hours to remove liquid from the paste and to form a solid; and
(e) sintering the solid at a temperature in the range of 900° C. to 1250° C. for 2-4 hours, wherein the sintered solid is an ion-conductive ceramic comprising sodium, at least one metal, oxygen, and phosphorous.

26. A method comprising:
(a) forming an aqueous mixture by mixing together in a liquid,
   (i) at least one sodium salt comprising a sodium cation and a basic anion,
   (ii) at least one metal oxide, and
   (iii) disodium phosphate ($Na_2HPO_4$) as a neutralizing agent;
(b) concentrating the aqueous mixture by heating at 180° C. for 1-2 hours to form a paste;
(c) calcinating the paste at 700° C. for 3 hours to remove any liquid from the paste and to form a solid; and
(d) sintering the solid at a temperature in the range of 900° C. to 1250° C. for 2-4 hours, wherein the sintered solid is an ion-conductive ceramic comprising sodium, at least one metal, oxygen, and phosphorous.

* * * * *